UNITED STATES PATENT OFFICE.

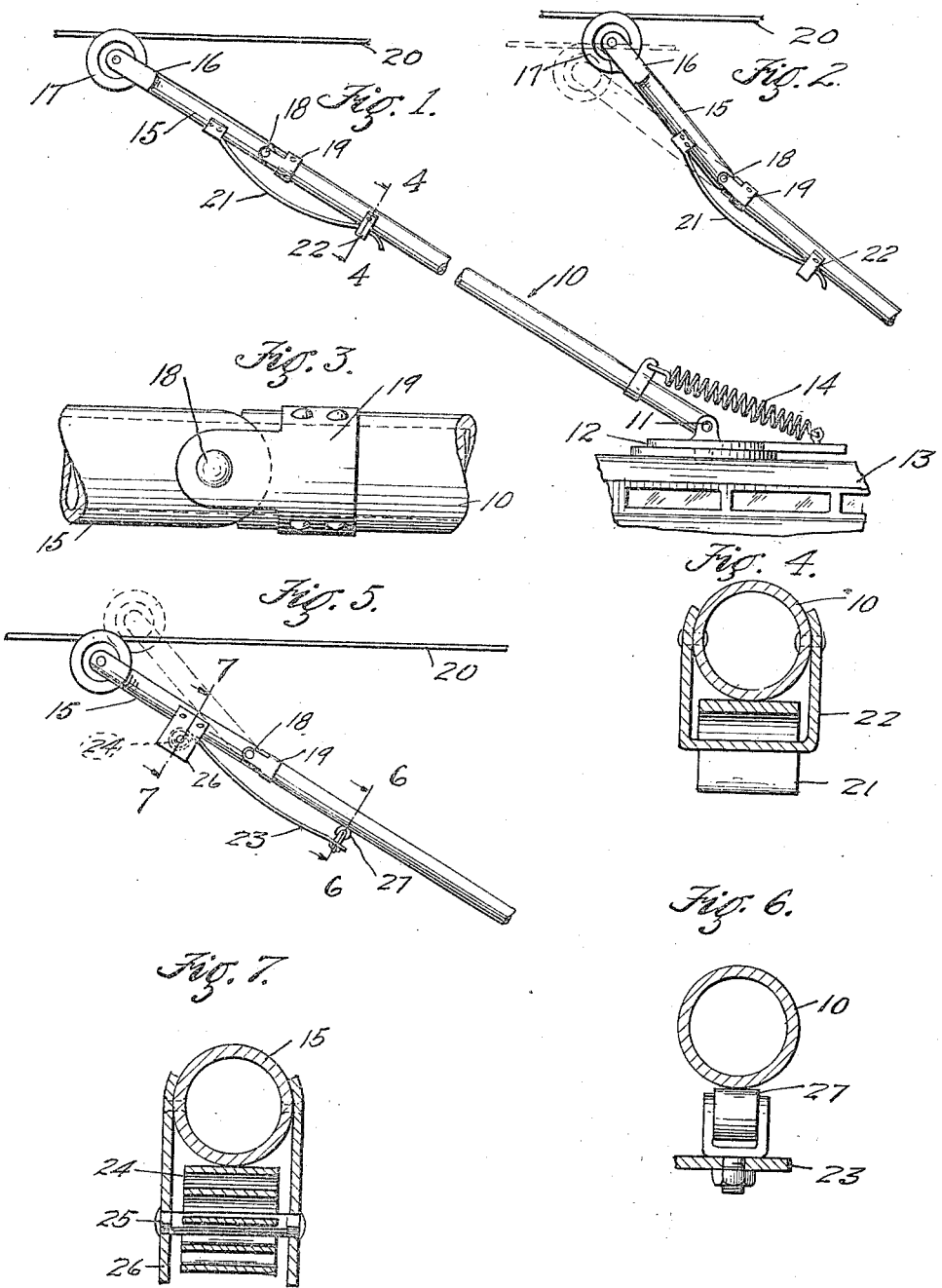

CHIPMAN J. WELLS, OF LONG BEACH, CALIFORNIA, ASSIGNOR OF ONE-THIRD TO SARAH L. DE LAND, OF LONG BEACH, CALIFORNIA.

TROLLEY.

1,193,447. Specification of Letters Patent. Patented Aug. 1, 1916.

Application filed December 9, 1914. Serial No. 876,306.

*To all whom it may concern:*

Be it known that I, CHIPMAN J. WELLS, a citizen of the United States, residing at Long Beach, in the county of Los Angeles, State of California, have invented new and useful Improvements in Trolleys, of which the following is a specification.

This invention relates to a trolley.

It is the object of this invention to provide a means for preventing a trolley from accidentally jumping out of engagement with the trolley wire.

Another object is to provide a trolley pole so constructed as to normally maintain a trolley wheel carried thereby in engagement with the trolley wire, and which will insure against accidental displacement of the trolley wheel by reason of variations in the level of the trolley wire.

A further object is to provide a trolley pole with a spring pressed pivoted harp, by means of which the harp will be permitted to have a quick vertical movement independent of the pivotal mounting of the trolley pole, so as to respond to variations in the plane of the trolley wire.

The invention is illustrated in the accompanying drawings, in which:

Figure 1 is a view of a trolley pole in side elevation, showing it as disposed in its normal position, with the trolley wheel engaging the trolley wire. Fig. 2 is a view, in side elevation, of the upper portion of a trolley pole, illustrating the manner in which the trolley wheel is caused to move in advance of the upward movement of the trolley pole to follow a raise in the trolley wire. Fig. 3 is a detail in side elevation, illustrating the hinged joint connecting the trolley pole and harp. Fig. 4 is an enlarged detail section on the line 4—4 of Fig. 1, as seen in the direction indicated by the arrows. Fig. 5 is a view in side elevation, illustrating a modified form of the invention. Fig. 6 is a detail section on the line 6—6 of Fig. 5. Fig. 7 is a detail cross section on the line 7—7 of Fig. 5, as seen in the direction indicated by the arrows.

More specifically, 10 indicates a trolley pole which is pivoted at its lower end for vertical movement on a pivot pin 11, carried by a turn-table 12, mounted to turn horizontally on the top 13 of a car. The trolley pole 10 is designed to be retained in its uppermost position by a spring 14, or any other suitable means, as commonly employed in a street-car trolley construction; the spring 14 exerting an upward pull on the trolley pole 10 adjacent its mounting on the pivot 11, as particularly shown in Fig. 1.

The present invention resides in providing the trolley pole 10 with a pivoted section or arm 15 at its upper end, which arm carries a trolley harp 16, in which the trolley wheel 17 is revolubly mounted in the usual manner. The arm 15 is mounted to swing vertically on a pivot pin 18, carried by brackets 19, on the trolley pole 10; the end of the arm 15 being rounded to extend into a socket on the end of the trolley pole 10, as illustrated in Fig. 3, to form a close joint between the arm 15 and the trolley pole.

Means are provided for opposing downward movement of the arm 15, by which the upward pull of the spring 14 may cause the trolley wheel 17 to bear against the underside of the trolley wire 20, and by means of which an upward pressure is exerted on the arm 15 when the trolley wheel is engaged with the trolley wire 20. This means is shown in Figs. 1, 2 and 4, as consisting of a plate-spring 21, rigidly mounted on the arm 15 and extending parallel therewith, with its lower end extending through a guide-yoke 22, on the trolley pole 10, and slidably contacting the under side of the latter, as shown in Fig. 1.

It is manifest that the spring 21 may be rigidly secured to the trolley pole 10, to bear against the arm 15. It is also obvious that any other suitable yieldable means may be provided for exerting an upward pressure or pull on the arm 15, in opposition to the pressure between the trolley wheel 7 and trolley wire 20.

Figs. 5, 6 and 7 illustrate a modified form of the arm-actuating means which consists of a rigid arm portion 23, extending parallel with the arm 15 and trolley pole 10, and having one end connected with a coiled spring 24, wound on and secured to a pin 25, carried by brackets 26, depending from the under side of the arm 15. The spring 24 is tensioned to normally exert an inward pressure on the member 23, against a roller 27 carried on the outer end thereof, bearing against the under side of the trolley pole 10. The spring 24 thus acts to exert an upward pressure on the arm 15, when the trolley wheel 17 is in engagement with the trolley wire 20.

In the operation of the invention, the trolley pole 10 is usually maintained in its uppermost position by means of the spring 14, or in any other suitable manner, with the trolley wheel 17 engaging the trolley wire 20. The upward pull of the trolley pole 10 causes the trolley wheel 17 to bear against the under side of the wire 20 and exert a downward pressure on the arm 15 in opposition to the spring 21 or 24, which spring is tensioned in such relation to the spring 14 as to normally maintain the arm 18 in alinement with the trolley pole 10, when the trolley wheel 17 engages the trolley wire 20, as illustrated in Fig. 1. In event the trolley wire 20 becomes elevated at any point, necessitating an upward movement of the trolley wheel 17 to maintain the latter in contact therewith, the spring 21 will operate to quickly advance the arm 15 in an upward direction to cause the trolley wheel to follow and remain in contact with the trolley wire. This movement of the arm 15 is in advance of the upward movement of the trolley pole 10, by reason of the shorter arc of travel of the trolley wheel in swinging on the pivot 18, which permits the spring 21 to act more quickly than the spring 14. The arm 15 will thus be advanced in relation to the trolley pole 10, as indicated in Fig. 2. In this manner the trolley wheel 17 will be maintained in constant contact with the trolley wire 20 and readily respond to any variations in the level of the trolley wire, independent of the trolley pole 10, thereby insuring the trolley wheel against jumping the trolley wire.

What I claim is:

A trolley pole comprising in combination, a pole formed in two sections, means pivotally connecting said sections permitting movement either side of the axis of one section, a harp, a trolley wheel, a flat spring provided with a spiral portion at one end secured to one section, slidingly engaged with the other section, and offset from the pole intermediate its ends, and means on the other section of said pole slidingly securing said spring thereto.

In witness that I claim the foregoing I have hereunto subscribed my name this 24th day of November, 1914.

CHIPMAN J. WELLS.

Witnesses:
JAMES M. ALBERT,
MARGUERITE BATES.

Copies of this patent may be obtained for five cents each, by addressing the "Commissioner of Patents, Washington, D. C."